April 14, 1970     YOW-JIUN HU     3,505,939
PHOTOGRAPHIC FILM HOLDER-PROCESSOR
Filed Dec. 27, 1967     2 Sheets-Sheet 1
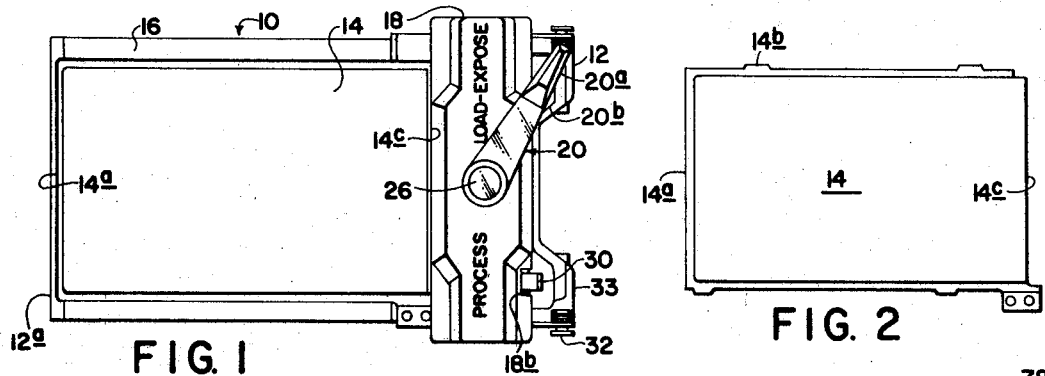
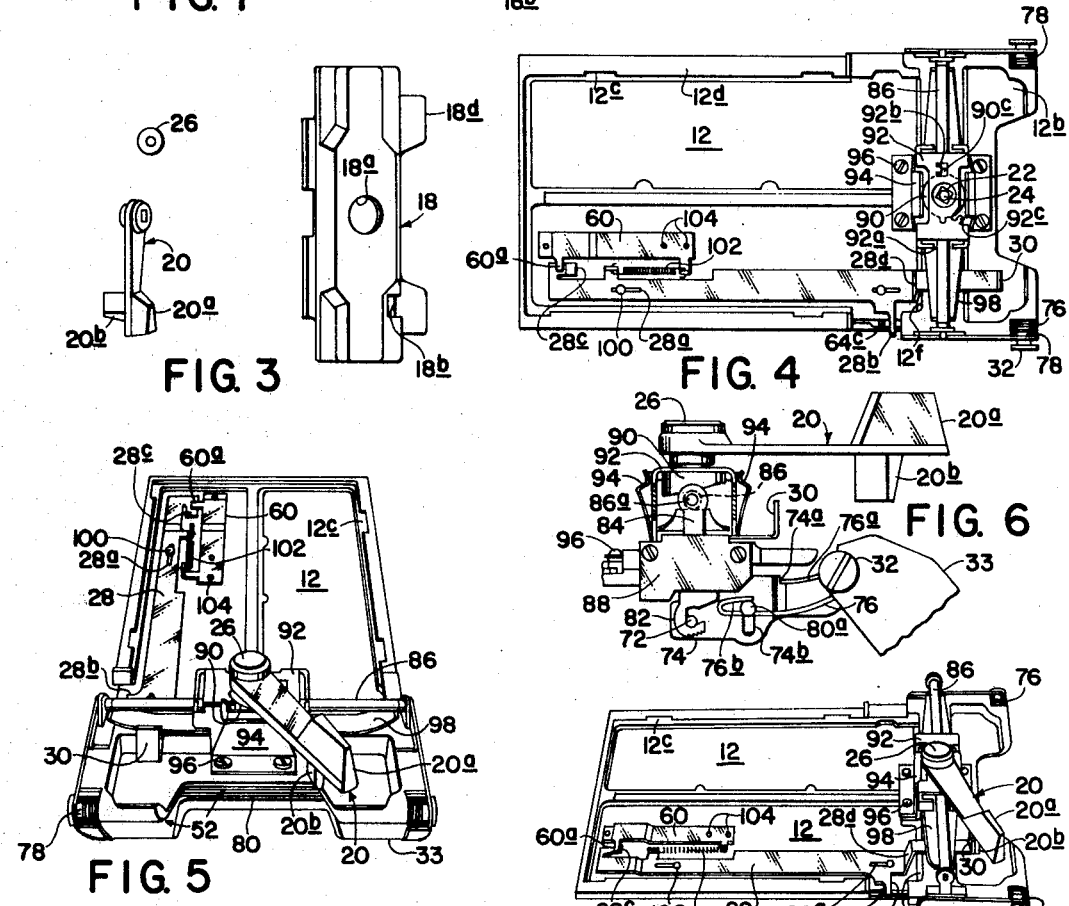
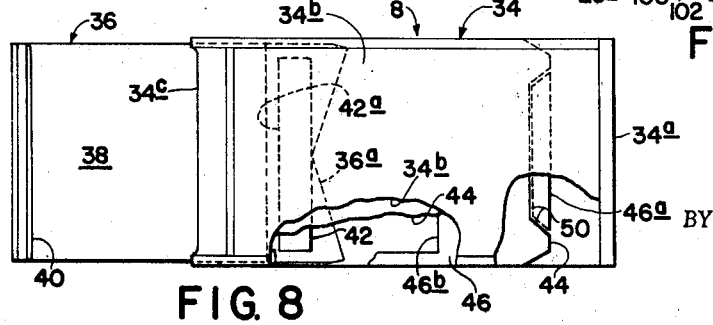
INVENTOR.
Yow-Jiun Hu
BY Brown and Mikulka
ATTORNEYS

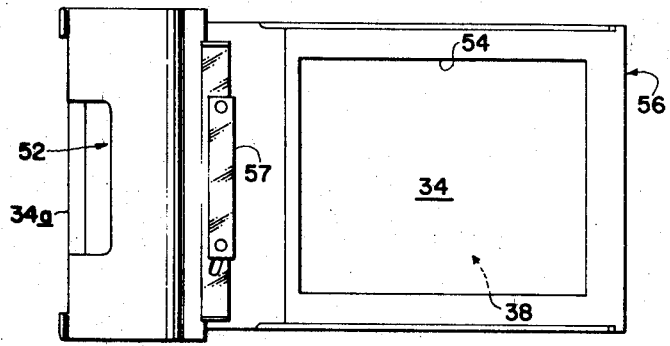
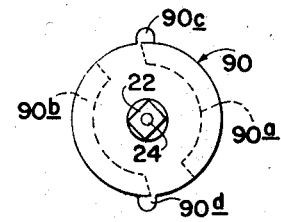
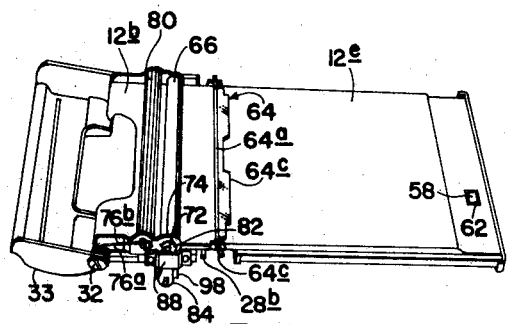
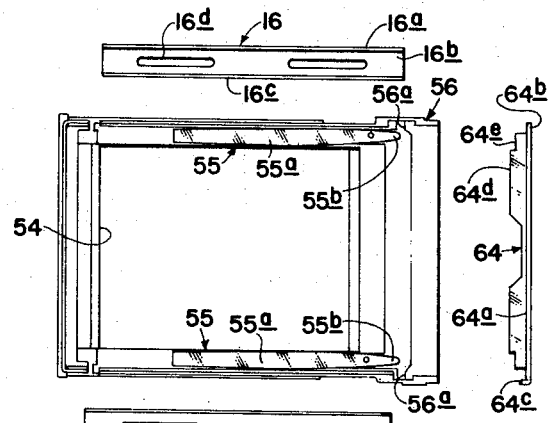
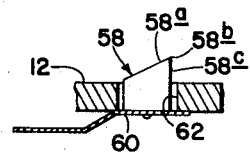
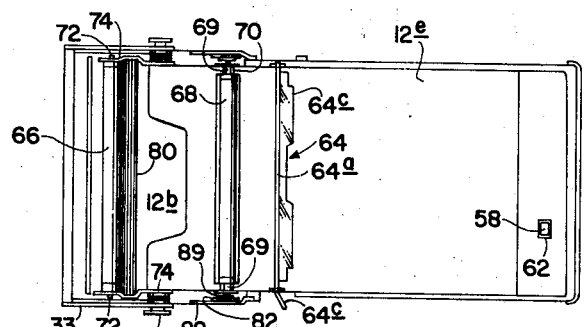
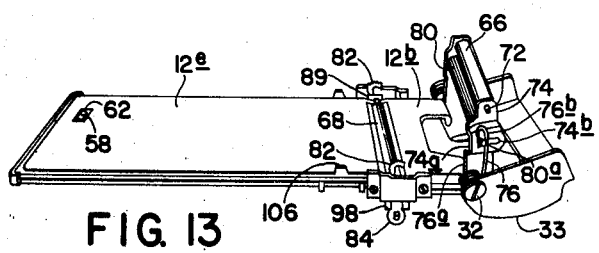

United States Patent Office 3,505,939
Patented Apr. 14, 1970

3,505,939
PHOTOGRAPHIC FILM HOLDER-PROCESSOR
Yow-Jiun Hu, 47 Cummings St., Medford, Mass. 02155
Filed Dec. 27, 1967, Ser. No. 693,950
Int. Cl. G03b 17/50
U.S. Cl. 95—13                                     12 Claims

ABSTRACT OF THE DISCLOSURE

A photographic film holder-processor apparatus having structure for both exposing and processing a film unit of a self-developing type. It is mounted on the back of a conventional camera utilizing complementary mounting structure and the exposure components of the latter. When thus mounted, as for example, in the manner of a standard film holder on a 4 x 5 press or view camera, the subject film holder-processor serves to slidably accept a photographic film unit so as to position a photosensitive surface at the focal plane of the camera for exposure. Furthermore it will permit withdrawl of the film unit between compressive members to facilitate development of the exposed film by the diffusion transfer process. The film unit may be removed from the holder-processor after exposure for subsequent development.

---

The photographic film holder-processor apparatus of the present invention, hereinafter termed the "film holder," for brevity, is intended for use with self-developing black-and-white or color film units of the type sold by Polaroid Corporation, Cambridge, Mass., U.S.A., one such film unit being generally described herein and in greater detail in U.S. Patent 3,253,160. The subject apparatus incorporates significant improvements over the film-holder apparatus of a related category described in U.S. Patent 2,933,993, also sold by Polaroid Corporation. In general, these improvements evolve from a more simple and positively operating structure, resulting in a greater functional reliability and a lower cost of manufacture.

Objects of the invention are to provide photographic film holder apparatus of improved construction and operational characteristics adapted to the mounting for exposure and, thereafter, the processing of a film unit of a so-called self-developing type; to provide a film holder of the character described which embodies novel means for swinging one of a pair of compression-applying members away from the other for cleaning or adjustment purposes; to provide a film holder as characterized, including means which enable, optionally, the processing of the film unit immediately following an exposure or at a later time thereby enabling a more favorable processing environment, or a more rapid succession of exposures, or both; to provide a film holder of the type stated wherein simplified mechanism insures positive settings of the compression-applying members at compressive and non-compressive positions; to provide a film holder of the category set forth which embodies positively operative detent means for positioning a photosensitive component of the film unit for exposure, for withdrawing a light-impervious envelope therefrom to permit the exposure, for returning the envelope to a covering position and for enabling withdrawal and attendant processing of the film unit; to provide a film holder of the aforesaid character in which simplified means are included for interlocking a positioning means for the compression-applying members and the detent means; to provide a film holder as indicated which includes protective cover or shield means enclosing certain parts which might otherwise permit a damaging entrance of extraneous light; and to provide a film holder as characterized wherein the actuating means is a lever movable to a "load-expose" or a "processing" position in a plane parallel to the principal plane of the film holder, thus avoiding any tendency to inadvertently draw the film holder away from the camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is a diagrammatic rear view of the film holder with the actuating-lever at a "load-expose" position;

FIG. 2 illustrates the removed cover plate of FIGURE 1;

FIG. 3 is a diagrammatic view of the removed hood and actuating-lever of FIGURE 1;

FIG. 4 is a diagrammatic rear view of the film holder after the hood, cover-plate and lever elements thereof have been removed, and with internal components including detent-actuating and compression-applying means shown at "load-expose" positions;

FIG. 4a is a detail view of the actuating cam of FIG. 4;

FIG. 5 is a diagrammatic perspective end view of the film holder with hood and cover-plate removed and the lever and internal components at "load-expose" positions;

FIG. 6 is a diagrammatic fragmentary side view of the pressure-roll mounting and compressive mechanism;

FIG. 7 is a diagrammatic perspective rear view of the film holder with hood and cover-plate removed. The actuating lever and internal components are at "process" positions;

FIG. 8 is a diagrammatic plan view of a film unit of a type suitable for use with the film holder;

FIG. 9 is a diagrammatic front view of the film holder;

FIG. 10 is a diagrammatic view of the removed framing plate, retaining clips, and envelope-engaging blade;

FIG. 11 is a diagrammatic perspective front view of the film holder with the framing plate and retaining clips removed and the pivotal cover opened;

FIG. 11a is a detail view of the latch component of FIG. 11;

FIG. 12 is a diagrammatic front view of the film holder with the front pressure roll and the light-shielding element swung to open position; and FIG. 13 is a diagrammatic perspective front view with the front pressure roll and the light-shielding element positioned as in FIG. 12, but with the envelope engaging blade removed.

The function of the film holder, when mounted on a camera, is, as previously intimated, to slidably accept a film unit of the type shown in FIG. 8 so as to position a photosensitive surface thereof at the focal plane of the camera, permit the removal of an opaque covering envelope component to a given distance, as illustrated, while holding the photosensitive surface component fixed, to enable the photographic exposure of the photosensitive surface, provide a return of the envelope to its covering position, and, finally, to permit a withdrawal of the entire film unit between compressive means of the film holder to release and spread a processing liquid and produce a finished photographic print by diffusion transfer on an internal image-receiving surface component. The latter component is then manually separated from other portions of the film unit which are discarded.

Referring now to FIGS. 1–4, the film holder 10 is shown from the rear, the opposite or front side being that adapted to face the camera lens. The film holder includes a principal generally-rectangular supporting plate-like element 12 formed, for example, of cast aluminum; a removable cover plate preferably composed of sheet aluminum; a pair of releasable elongated retaining clips 16, having right-angled surface portions 16a, 16b and 16c which hold the cover plate in assembled relation with the plate 12 and with a framing plate 56 to be described, and having slots 16d for accepting complementary attaching means of a camera; a raised bead 12a of supporting plate 12 for engaging an end 14a of the cover plate; a removable protective partial housing or hood 18 preferably formed of an injection-molded polystyrene; and a manually-operable lever 20 releasably-mounted on a square shaft 22 having a threaded internal bore 24 in which is inserted a retaining screw 26. The lever includes a handle 20a and an actuating lug 20b. At the two positions designated "load-expose' and "process" it serves to provide two corresponding settings of internal mechanism of the film holder to be described.

The hood 18 includes a central aperture 18a through which the shaft 22 protrudes rearwardly, a side aperture 18b through which a longitudinally-slidable detent-operating bar 28 having an actuating handle 30 extends rearwardly at approximately 90°, and two pairs of laterally-extending mounting flanges 18c and 18d. When the cover plate 14 is mounted on the plate 12, as positioned and held, respectively, by the end 14a thereof in contact with the bead 12a, the flanges 14b within the recesses 12c, and the clips 16 in engaging relation, the end 14c of cover plate 14 overlaps the flanges 18c of the hood so that, in conjunction with the bearing flanges 18d, the hood is held firmly seated. Pivotal means 32 are mounted in a pair of perforations formed in end-portions 12b of the plate 12 for hingedly-attaching a frontally-located generally-curved cover 33 enclosing compressive means to be described. A plurality of sideways-extending flanges 14b of the cover plate 14 are adapted to fit within mating recesses 12c formed in longitudinal side portions 12d of the plate 12.

The film unit 8 of FIG. 8 comprises an opaque envelope 34 having a closed end 34a and an open end 34b, a sheet-like film component 36 slidably mounted therein and including a photosensitive emulsion 38, a flared clip 40 formed of a resilient metal or other resilient material, fixedly attached to one end of film component 36, and a container or pod 42 mounted on an extension 36a of component 36 and releasably enclosing a processing liquid. The liquid is adapted to be released between the separable edges 42a of the liquid container when the entire film unit is passed between compressive means such as a pair of pressure rolls, commencing with the leading or right-hand edge 34a of the envelope.

An image-receiving sheet 44 and a masking sheet 46 are located, in order, inwardly of the facing wall 34b of the envelope. The masking sheet includes a rectangular aperture 46b which ultimately determines the area of emulsion 38 which is subjected to the released processing liquid and thus controls the final image area. The masking sheet 46 is bonded, as by heat sealing, both to the far side of the image-receiving sheet 44 and, at section 46a thereof, to the inner surface of the envelope wall 34b which is nearest the viewer. This provides that the image-receiving sheet 44 and the mask 46 are held, as a unit, within the envelope 34 while the envelope 34 is withdrawn from film component 36 to perform an exposure. The raised transverse cross-strip or flange 48 in conjunction with mechanism of the film holder to be described, limits the distance to which envelope 34 can be withdrawn. The section 46a of the masking sheet is attached to the major remaining portion thereof at semi-perforations 50. Thus, after the processing liquid has been released and spread between the emulsion 38 of film compoment 36 and the inner surface of the image-receiving sheet 44 which faces the emulsion, the film component and area of the image-receiving sheet determined by the aperture 46b of the masking sheet are bonded together. Accordingly, the film component 36, image-receiving sheet 44 and major portion of the masking sheet 46 can be removed from the envelope as a unit at a final processing stage by manually pulling upon the clip 40 while holding the envelope fixed. This becomes possible by reason of the separation of the major portion of the masking sheet 46 from its section 46a along the semi-perforations 50.

With the lever 20 at "load-expose" position a film unit 8 may be slidably inserted for exposure and processing in the film holder through a slot-like aperture 52 thereof (FIG. 5), it being understood that the film unit, as initially supplied has its photosensitive component 36 positioned completely within the envelope 34. The film unit clip 40 thus overlaps a marginal portion of the envelope at end 34c to provide a light seal. When thus inserted, the film unit is held flat against a planar surface 12e of the supporting plate 12 at the side thereof illustrated in FIGS. 11–13 which, of course, is the side opposite that shown in FIGS. 1, 4, 5 and 7. The surface 12e effectively constitutes the focal plane of the camera when the film holder is attached to the latter.

When fully inserted in the film holder through aperture 52, as shown in FIG. 9, one end of the film unit is located at an indented portion 10a of the film holder whereat the envelope portion 34a thereof can be grasped manually either to remove the envelope for performing an exposure or, thereafter, for withdrawing the entire film unit. That portion of the envelope 34 which covers the underlying photosensitive emulsion 38 is positioned at the exposure aperture 54 of the film holder. The exposure aperture is formed within a removable framing element or plate 56 shown in overturned condition in FIG. 10. The framing plate 56 is held in assembled relation with the supporting plate 12 and with the cover 14 is at longitudinal side portions by the clips 16 (FIG. 2). A pair of flat springs 55 is fastened to the framing plate so as to extend along longitudinal marginal under-portions thereof. Portions 55a of these springs are adapted to bear against the film unit and bias it toward the surface 12a, contributing, particularly, to hold the film component correctly positioned for exposure. Spring portions 55b are adapted to bear against recessed portions 64e of vane element 64 to bias it to a rotational position for engaging strip 48 of the envelope 34. The framing plate 56 also includes a transversely slidable latch element 57 which is adapted either to fasten or release the cover 33.

Two detent elements of the film holder, adapted to be selectively brought into direct contact with complementary means of the film unit or released from contact therewith to control exposure and processing operations are shown in FIGS. 10–13. One of these elements 58, illustrated in detail in FIG. 11a, is in the form of a small retractably-mounted block-like latch or catch having an acutely-angled frontal surface 58a terminating in an apex 58b and a rearwardly extending surface 58c, the latter being that most distant from the film unit entrance aperture 52. The latch 58 is attached to a resilient arm 60 and is thus adapted to forward and rearward movement in an aperture 62 formed in supporting plate 12. The surface 58a is adapted to slidably contact a flared edge of the film unit clip 40 when the film unit 36 is being inserted into the film holder 10. After the clip 40 passes beyond the apex 58b, the surface 58c in contact with an edge of the clip holds the film unit against displacement.

The other detent element 64 is in the form of a blade or vane including an integral shaft 64a adapted to pivotal mounting of end-portions 64b thereof in slots 56a of the aperture plate and having an angular appendage 64c constituting a lever which depends from one extremity thereof. The edges 64d of the vane are adapted to contact one edge of the elevated cross-strip 48 of the film unit envelope 34 is to establish a given limit of withdrawal of the envelope at one pivotal position of the detent element 64 and to permit unobstructed movement of the envelope at a second pivotal position thereof.

In FIGS. 6, 11, 12 and 13, there is illustrated compression-applying means for mounting and actuating specific compressive elements for processing an exposed film unit as, for example, a pair of rotatable, preferably hard-surfaced pressure rolls 66 and 68 formed, for instance, of a stainless steel. The rear pressure roll 68 is mounted for rotation about the shaft 69, the latter being fixedly held in the open mounting slots 70 (FIG. 12). Accordingly, this pressure roll can easily be lifted out of the slots for any required purpose. The front pressure roll 66 is mounted for rotation on the fixed shaft 72 which is fixedly mounted in apertures formed in a pair of arms 74, the latter, in turn, being mounted for rotation about the pivotal means 32 which, as previously mentioned, serve additionally to mount the cover 33. The arms 74 are biased forwardly so as to position the front roll 66 in spaced relation to the rear roll 68 by the extremities 76a of a pair of torsion springs 76 mounted around the circular spacer elements 78, adjacent to pivots 32. Extremities 76a bear against edges 74a of the arms 74. The words "front" and "rear," as employed herein, relate to adjacency or remoteness with respect to the exposure-aperture side or front of the film holder.

Also mounted on the arms 74, is an elongated circular element or roll 80 formed of a highly resilient material such as a longitudinally-fluted soft rubber or the like. This element serves primarily as a light shield adjacent to the entrance aperture 52 through which the film unit is inserted. Element 80 is permitted translational movement toward and away from frame portions 12b by reason of the mounting of its stub shafts 80a in a pair of slots 74b formed in arms 74. The element 80 is biased toward plate portions 12b by the other extremities 76b of the torsion springs 76 which bear against the grooved extremities of the stub shafts 80a. To achieve the above-described biasing of the front roll 66 and the light-shielding element 80, it will be understood that the extremities of each torsion spring 76 exert a biasing force in opposite directions, that is, they would cross one another if the spring were removed and in its natural state. In addition to its aforesaid light-shielding function, element 80 contributes in guiding the film unit into entrance aperture 52 in a positive manner, without exerting undue pressure on container 42 such as to cause its fracture and release of the processing liquid.

At the position of components illustrated in FIGS. 6 and 11, the shaft 72 of the front pressure roll 66 is engaged at each end by one of a pair of hooks 82 forming integral extremities of a pair of arms 84. The arms 84 are pivotally attached to the extensions 86a of a transverse rod 86 and are adapted to move substantially linearly forwardly and rearwardly, that is, down-and-up as shown in FIG. 6, carrying the front pressure roll 66 in similar directions, in response to actuating movement of the crossrod 86. Actually, these movements are slightly arcuate due to the pivotal mounting of arms 74 at pivots 32. When the pressure roll 66 is brought to a non-compressive relation with pressure roll 68, at the "load-expose" position of lever 20, as explained below, the hooks 82 may be manually released from their engagement with shaft 72 by pivoting them away therefrom. The subassembly of arms 74 bearing roll 66 and element 80 may then be swung away, as shown in FIGS. 12 and 13, to provide access to the rolls for cleaning or other purposes.

The cross-rod 86 constitutes a cam-follower and undergoes its aforesaid linear movement in response to movement of a cam member 90, mounted for rotation about an axis which is normal to the plane surface 12e of supporting plate 12. The cam is mounted in a bracket 92 fixed to plate 12. The bracket includes a pair of guide slots 92a contributing to linear movement of rod 86. Cam 90 comprises a pair of cam segments or lobes 90a and 90b adapted, when positioned at maximum height, to bear simultaneously against spaced portions of the cross-rod 86, thereby to provide its translational movement with substantially no transverse tilt from end-to-end, that is, to maintain its continuous parallelism to the plane of the film-holder surface 12e. The cam lobes are so formed as to require a rotation of approximately 130° to achieve maximum functional lobe thickness or height. The cam includes a pair of radially-projecting lugs or ears 90c and 90d at diametrically-opposed peripheral locations.

A pair of angularly-shaped flat springs 94 is mounted on plate 12 in overlying relation to the portions of bracket 92 attached to the plate, the screws 96 serving to attach both the bracket and springs thereto. The angled tips 94a of the springs are adapted to compressively bear against the opposite peripheral surfaces of the cam 90 and, when the cam is rotated by lever 20 so as to bring the lugs 90c and 90d in contact with the springs, the latter are flexed outwardly and exert an increased pressure against the lugs. Upon further turning of the cam 90, the lugs are brought to an over-center relation with the springs, the latter functioning as toggle springs to induce an additional rotation of the cam.

Assuming the cam 90 to have been turned in a counter-clockwise direction by lever 20, to its maximum degree of rotation, as indicated in FIGS. 4 and 5, the lug 90c has been brought into contact with limit stop 92b of the bracket. The maximum thickness of the cam lobes 90a and 90b has been caused to be positioned and bear against the cross-rod 86. The tips of the flat compression spring 98, contacted by the extremities of rod 86 have been forced forwardly thus preventing the flat compression spring 98 from biasing the rod 86 rearwardly in a manner to carry front pressure roll 66 toward pressure roll 68 through the medium of the arms 84 and hooked portions 82 thereof. Accordingly, pressure roll 66 is biased away from pressure roll 68 by the separative action of torsion spring extremities 76a, as previously described. The pressure rolls are now spaced apart so as to premit introduction of a film unit therebetween and thence, completely within the exposure chamber formed by surface 12e and the framing plate 56, the various components now being at the "load-expose" condition.

Let it now be assumed that the lever 20 and cam 90 are turned in a clockwise direction toward the position shown in FIG. 7. A continuously diminishing thickness of the cam lobes is brought into contact with the cross-rod 86. The compression spring 98 commences to assume control, having, of course, a far greater strength than the torsion spring 76, carrying the rod 86, arms 84 and front pressure roll 66 toward pressure roll 68. A continued clockwise rotation of the cam 90 brings the lugs 90c and 90d in contact with the springs 94. When the lugs 90c and 90d have passed beyond a theoretical line extending longitudinally of the film holder through the center of the cam and normal to the contacting surfaces of the springs, the latter exert a biasing force causing the cam to snap to a maximum degree of clockwise rotation determined by contact of the lug 90c with the limit stop 92c of the bracket. As previously indicated, the limit stops 92b and 92c are positioned approximately 130° apart. The front pressure roll 66 will thus have been brought to its maximum compressive relation with the rear pressure roll 68, under the influence of the compression spring 98. Under the dominating influence of springs 94, abetted by spring 98, it will be noted that the lever lug 20b, in contact with the driving handle 30, has pushed bar 28 to its left-hand limit. This occurs in opposition to biasing forces identified with the detent means, next to be described.

Detent mechanism of the film holder for selectively engaging and retaining the photosensitvie film component 36 of the film unit 8 while the envelope 34 is remove therefrom to permit its photographic exposure; for limiting the degree to which the envelope may be removed;

for enabling the return of the envelope to its covering position; and for making possible the withdrawal of the entire film unit between the pressure rolls and, thence, through the aperture 52 to a location externally of the film holder will now be described in detail. The elongated generally-flat slide-bar 28 (FIGS. 4, 5 and 7) is so mounted as to readily permit a given amount of longitudinally linear movement thereof. This is rendered possible by contact of a smooth or low-friction surface of the bar with a similarly smooth surface of the film-holder plate 12 and by the elongated slots 28a formed in the bar which are in slidable contact with the two studs 100 projecting rearwardly from surface 12.

Bar 28, including the handle 30 at its extremity, an integral, transversely-extending detent actuating pin or arm 28b, adapted to contact lever 64b of the vane 64, and a detent-camming surface-portion 28c adapted to actuate latch 58 for engaging clip 40 of the film unit at the other extremity, is biased in a given direction by an extension spring 102, attached respectively to the movable slide-bar 28 and the fixed supporting plate 12. This direction, providing bar movement to the position shown in FIGS. 4 and 5 and actuated by movement of lever 20 to maximum counterclockwise position, namely, its "load-expose" position, is toward that end of the film holder at which the compression-applying means are mounted. The extent of this movement of bar 28 is determined by limit-stop means in the form of an angled bar portion 28d and a similarly-angled frame portion 12f. Handle 30 of the bar 28 is thereby positioned so as to be subject to contacting by the lug 20b of the lever 20, when the latter is moved to the "process" position. Limit stop means in an opposite direction are provided by contact of studs 100 and the ends of slots 28a, as shown in FIG. 7.

The latch 58 (FIGS. 11–13) is mounted on a resilient arm 60 for forward and rearward movement within the aperture 62, as previously stated. Arm 60 is, appropriately formed of a flexible material, e.g., of a spring steel and is fixedly attached at one end to plate 12, as by rivets 104, its other extremity being subject, by reason of its flexibility, to raising or lowering with respect to plate 12 through slidable contact or withdrawal of the camming surface portion 28c of the bar relative to the raised ear or lip 60a of the arm, the latter constituting a cam follower. With lever 20 at the "load-expose" position, arm 60, by reason of its inherent spring-like composition, biases the latch 58 to its forward or engaging position. The latch 58 is moved to its non-engaging position, as above described, by rotation of lever 20 clockwise to the "process" position.

The vane 64, as previously intimated, is mounted for rotation, in bearing slots 56a of the framing plate 56. Assuming the framing plate to be fastened to supporting plate 12, the vane is held so positioned by a pair of lugs or tabs 106 integral with and projecting forwardly from plate 12 so as to contact and provide bearing surfaces for the shaft end-portions 64b. With lever 20 at the "load-expose" position, the vane 64 is rotationally positioned for engaging strip 48 of the envelope during removal of the latter, due to rotational bias applied to vane portions 64e by the spring components 55b. The vane is turned to its non-engaging position, through the instrumentality of arm element 28b in contact with the vane lever 64, by rotating lever 20 clockwise to the "process" position.

It will be apparent, from the foregoing description that, with lever 20 at the "load-expose" position, the handle 30 may serve as a means for direct manual actuation of both detent means 58 and 64 to proivde a non-contacting position thereof with respect to clip 40 and envelope strip 48 thereof. This permits a release of the detent means from engagement with the film unit at the "load-expose" or separated condition of the pressure rolls. Accordingly, an exposed film unit can be removed from the film holder without processing it if, for example, it is desired to perform processing under more favorable temperature conditions or perform a succession of exposures rapidly. On the other hand, in the more usual operation the combination of the lever-lug 20b and handle 30 constitute interlocking components relative to the pressure roll positioning means and the detent means to provide an indirect or combined operation. In urging lever 20 through its final arc of rotation in a clockwise direction by a compressive rotation-inducing contact of springs 94 with the cam lugs 90c and 90d, supplemented by the compressive force of spring 98 which tends to urge slidable movement of crossbar 86 across the diminishing taper of the cam lobes, the much stronger forces exerted by spring elements 94 and 98 offset those of a counter nature applied by the springs 55b and 102. In the above-described structure, it will be noted that no additional or special components are necessary to enable an optional direct or indirect operation of the detent mechanism.

A brief resumé of operation follows: With lever 20 at the "load-expose" position of FIGURE 1, the pressure rolls 66 and 68 are spaced apart through the instrumentality of cam 90 bearing against rod 86 to render spring 98 non-functional and permit torsion spring 76 to move arms 74, mounting pressure roll 66, in a direction carrying the latter away from roll 68. The detent latch 58 and detent vane 64 are simultaneously at engaging positions relative to components of the film unit, as biased by the spring elements 60 and 55b respectively. The film unit 8 is then loaded into the film holder, marking (not shown) provided on the envelope thereof designating the surface which is to be positioned face-up in the exposure chamber and visible through aperture 54. Assuming the film holder to be attached to a camera, the film-unit envelope is grasped at 52 and slidably withdrawn to a position determined by contact of detent vane 64 with the envelope strip 48. Coincidentally, the photosensitive sheet 36 is held fixed at exposure position within the area of aperture 54 through engagement of the latch 58 with the film-unit clip 40. The photographic exposure is performed and the envelope then slidably returned to its initial covering position. Lever 20 is moved to the "process" position thus inactivating the cam 90 and associated components and bringing the pressure rolls to compressive relation under the influence of spring 98, through the medium of rod 86 and hooked arms 84. At the same time, the detent elements 64 and 58 are moved to non-functional positions through movement of handle 30, as induced by lug 20b, thereby moving bar 28 so as to provide contact of arm 28b with lever 64c of the vane to rotate the latter, and causing contact of camming element 28c with cam-follower 60a to retract the latch 58. An optional direct manual actuation of handle 30 to provide an independent operation of the detent mechanism has already been described.

To achieve the foregoing sequence of operations a straightforward, uncomplicated structure and interrelation of components is provided. Among advantages of the subject structure are the following. The cam 90 may be readily rotated in a direction which will not tend to apply an undesirable separative force between the camera and attached film holder. Merely one actuating bar 28 and a minimum of associated components perform a multiplicity of functions. The bar 28 is rendered operational either by direct manual movement of the handle 30 or, in conjunction with the positioning of the compressive means through movement of the lever 20. Mechanism controlling the positioning of the movable pressure roll 66 is safeguarded against inadvertent physical contact by the hood 18, the latter also serving as a shield against light leaks. The springs 94, acting on the cam lugs 90c and 90d, "snap" the pressure rolls and associated mechanisms to a positive disposition for performing the processing operation. The detent latch 58 and detent vane 64 are so formed and disposed as to perform positive engaging and release operations not previously attainable. In this connection, it is to be noted that the latch 58 is adapted to contact but a small transverse portion of the film-unit clip 40, leading to a more certain engagement. The pivotal or "swing-away" mounting of the pressure roll 66, made available by placing lever 20 at the "load-expose" position and releasing the hooks 74, enables an access to components which is of distinct advantage for inspection and cleaning purposes.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus adapted to attachment to a rear surface of a camera to effect photographic exposure and processing of a self-developing film unit, the film unit including a protective envelope which is slidably withdrawable to perform said exposure and returnable after the exposure to its covering position for processing purposes, said apparatus comprising a generally rectangular supporting plate-like member, means located at one side of said plate-like member including a plane surface for supporting a photosensitive component of said film unit for exposure, a framing element having an exposure aperture adapted to overlie said plane surface for cooperating with said surface to form a chamber for mounting said film unit for exposure, detent means for controlling the retention and release of said photosensitive component at said plane surface and the withdrawal of said envelope to perform said exposure, mechanism located at an opposite side of said plate-like member which, optionally, is directly and indirectly manually actuatable for operating said detent means, compression-applying means for processing said film unit comprising a pair of compressive elements adapted to advancement and compression of said film unit therebetween, one of which is fixedly located on said plate-like member and the other mounted thereon for translational movement with respect to said one compressive element, separative spring means for spacing said other compressive element from said one compressive element, compressive spring means for providing the force exerted by said compressive elements on said film unit, a cam member so mounted on said plate-like member as to be rotatable about an axis substantially normal to said plane surface which, when turned to one position, is adapted to apply a force opposing that of said compressive spring means to relieve the compressive elements of an application of force thereby and permit said separative spring means to assume control and space them apart, and, when turned to a second position, is adapted to permit said compressive spring means to assume control by an application of force and position said compressive elements in functional compressive relation, means providing a light-shielded aperture adjacent to said compressive elements for insertion and withdrawal of said film unit relative said exposure chamber, a manually-operable lever for rotating said cam member to each said position, and means adapted to interlock said lever and said detent operating mechanism to provide a predetermined operative interrelation of said compressive elements and said detent means at each said position.

2. Apparatus, as defined in claim 1, wherein said detent means comprises a movable latch element for releasably engaging a clip of said film unit and a rotatable vane element for releasably engaging said envelope and wherein said detent operating mechanism comprises a slidable bar spring-biased for movement in a given direction and having a driving handle at one end for moving said bar longitudinally in a direction opposed to said given direction, camming means at an opposite end of said bar for actuating a cam follower carrying said latch element, and an intermediate transversely extending arm for actuating lever means of said vane element extending to said opposite side of said plate-like member, said latch element being adapted to translational movement to engaging and retracted positions in an aperture passing through said plate-like member.

3. Apparatus, as defined in claim 2, wherein limit-stop means are included to define the limits of movement of said slidable bar in said given and opposed directions.

4. Apparatus, as defined in claim 2, wherein said interlock means is in the form of a lug projecting from said lever and adapted to actuate said driving handle at said second position of said cam member.

5. Apparatus, as defined in claim 1, wherein said compression-applying means comprises a translationally movable transverse rod constituting a cam follower relative to said cam member, guide means enabling in linear movement of said rod, compressive spring means in the form of a flat spring element the extremities of which bear against end portions of said rod, a first pair of arms mounting therebetween at first ends said other compressive element and pivotally attached at second ends to said plate-like member, and a second pair of arms pivotally attached at first ends to the extremities of said rod and releasably attached at second ends to said first ends of said first pair of arms, whereby rotation of said cam member, as provided by said manually-operable lever, through the instrumentality of said rod, flat spring element, first and second pairs of arms, and separative spring means bearing against said first pair of arms, provides, alternatively, a compressive and non-compressive relation of the compressive elements.

6. Apparatus, as defined in claim 5, wherein the releasable attachment of said second pair of arms to said first pair of arms is in the form of a pair of manually-releasable hooks pivotally engaging a pair of projecting portions of said first pair of arms, said hooks, when released, permitting said other compressive element to be pivoted completely away from said one compressive element for cleaning and general access purposes.

7. Apparatus as defined in claim 5, wherein are included a plurality of individual releasable cover means, a first enclosing said detent mechanism, a second enclosing said compressive elements, and a third enclosing said cam member, rod, guide means, and compressive spring element, said lever extending outwardly of said third cover means.

8. Apparatus, as defined in claim 5, wherein said cam member includes a pair of cam lobes enabling a contact with said rod at two spaced portions, wherein the periphery of said cam member includes a pair of diametrically-opposed radially-projecting lugs, and wherein a pair of angularly-formed flat springs are so mounted on said supporting plate-like member as to bear against the peripheral surface and lugs of said cam member and constitute toggle-springs adapted to urge an extension of the rotation of said cam member when said lugs have passed beyond a theoretical center-line extending through the axis of said cam and the contact points of said springs with the periphery thereof.

9. Apparatus, as defined in claim 6, wherein said compressive elements are pressure rolls adapted to rotation about mounting means thereof which are, respectively, fixedly located and translationally movable relative to said plate-like member.

10. Apparatus, as defined in claim 9, wherein said fixedly located mounting means are adapted to removal from complementary engaging means of said plate-like element to permit the pressure roll, thus located to be removed.

11. Apparatus, as defined in claim 3, wherein said separative spring means is a pair of torsion springs, the extremities thereof being adapted to bear against said first pair of arms.

12. Apparatus, as defined in claim 2, wherein said framing element includes a pair of flat spring elements a major portion of which is utilized for holding said film unit firmly mounted against said plane surface in said exposure chamber, and a minor portion of which is employed for biasing said vane detent element for rotation to a position for engaging a complementary component of said film-unit envelope, said major and minor portions extending in relatively opposite directions from intervening portions fixedly attached to inner surfaces of said framing element.

References Cited

UNITED STATES PATENTS 3,437,024 4/1969 Downey et al. _____ 95—13
3,283,682 11/1966 Rice _____ 95—13

NORTON ANSHER, Primary Examiner

R. L. MOSES, Assistant Examiner

UNITED STATES PATENT OFFICE
CERTIFICATE OF CORRECTION

Patent No. 3,505,939                                  April 14, 1970

Yow-Jiun Hu

It is certified that error appears in the above identified patent and that said Letters Patent are hereby corrected as shown below:

In the heading to the printed specification, line 3, "Yow-Jiun Hu, 47 Cummings St., Medford, Mass. 02155" should read -- Yow-Jiun Hu, Medford, Mass., assignor to Polaroid Corporation, Cambridge, Mass., a corporation of Delaware --. Column 1, line 43, "construction" should read -- constructional --. Column 4, line 37, cancel "is"; line 64, "into" should read -- in --; line 75, cancel "is". Column 6, line 72, "photosensitvie" should read -- photosensitive --. Column 7, line 7, "longitudinally" should read -- longitudinal --; line 8, "longitudinally" should read -- longitudinal --; line 67, "proivde" should read -- provide --. Column 9, line 55, after "relative" insert -- to --.

Signed and sealed this 12th day of January 1971.

(SEAL)
Attest:

EDWARD M. FLETCHER, JR.                      WILLIAM E. SCHUYLER, JR.
Attesting Officer                                Commissioner of Patents